Patented Oct. 2, 1951

2,569,986

UNITED STATES PATENT OFFICE 2,569,986

EXTRACTIVE CRYSTALLIZATION PROCESS

Lloyd C. Fetterly, Seattle, Wash., assignor to Shell Development Company, San Francisco, Calif., a corporation of Delaware No Drawing. Application March 12, 1948, Serial No. 14,644

14 Claims. (Cl. 260—676)

This invention is directed to an improvement in the extractive crystallization process. More particularly, it is concerned with improvements in the operating conditions for said process and for the sharper fractionation thus made possible.

The extractive crystallization process briefly comprises the fractionation of mixtures of organic compounds by the formation of crystalline complexes between a complex-forming agent and a particular fraction of such mixtures. The agents known to form such complexes are urea and its analogs; namely, thiourea, tellurourea and selenourea. The action of each of these agents is specific and appears to be governed at least to a certain extent by the size of the group VI element present in the agent. This point is more clearly explained hereinafter.

Extractive fractionation is normally carried out by contacting the mixture of organic compounds to be fractionated with a solution of the complex-forming agent. Upon intimate contact, such as by agitation, crystalline complexes are formed between the agent and the fraction of the mixture capable of forming complexes with the agent. It has been found advantageous to maintain a multiplicity of phases when carrying out the process. Under these conditions, especially when the agent is dissolved in water, it has been noted that a thixotropic mixture is formed which is difficult to handle in conventional operating equipment. The thixotropic properties of the reaction mixture appear to be due at least in part to an emulsifying tendency of the several phases. Further, it has been noted that the separation of such reaction mixtures proceeds with difficulty and that the crystalline complexes tend to associate with the remaining members of the original mixture rather than with the solution of the agent.

It will be appreciated that each of the above phenomena is undesirable. The processing of thixotropic, semi-emulsified mixtures is difficult and usually results in incomplete separation of the phases. The time lag usually necessary to permit maximum separation of the phases decreases the efficiency of the process and, because of practical considerations, usually prevents complete phase separation. The association of the complexes with the remaining free organic compounds rather than with the solution of the agent prevents purification of the fractions which it is wished to obtain.

It is an object of this invention to improve the extractive crystallization process. It is another object of this invention to provide a means for cleaner fractionation by the extractive crystallization process. It is a third object of this invention to provide a means for the rapid separation of the reactants into desirable phases. It is another object of this invention to provide a means for causing the crystalline complexes to associate with the solution of the complex-forming agent. Other objects will become apparent during the following discussion.

Now in accordance with the present invention, crystalline complexes of the character described are contacted with a special selective solvent. This solvent is one which will dissolve the mixture of organic compounds being extracted. Furthermore, the solvent is soluble only to a minor extent in the solution of the complex-forming agent. The solvent thus acts to substantially prevent miscibility of the agent in the mixture of organic compounds being extracted.

The use of the particular type of solvent described above promotes rapid phase separation of the reaction mixture. This deprives the reaction mixture of its normally thixotropic nature. The crystalline complexes formed associate with the phase containing the agent rather than with the phase containing the remainder of the mixture of organic compounds. The purity of both fractions is thus improved.

The special solvents to be used in accordance with this invention are characterized by their solubility properties and effect on surface tension and wetting properties rather than by their generic chemical identity. They should be miscible in all proportions with the mixture of organic compounds to be fractionated, at least at the temperature of fractionation. Furthermore, they should be soluble only to a minor degree in the solution of the complex-forming agent, the latter solution being immiscible with the solution of the mixture of organic compounds. By the expression "soluble only to a minor degree" is meant a liquid material which is soluble in the solution of the agent in proportions from 5 parts to 20 parts per 100 parts by weight of the solution of the agent. More preferably, the solubility is within the range 10–15 parts per 100 parts of the solution of the agent.

Suitable selective solvents having these properties, preferably employed with aqueous solutions of the agent, include especially some of the butanols and pentanols such as normal butanol, secondary butanol, isobutanol, pentanol-2 and pentanol-3. Other alcohols which may be used are crotonyl alcohol, and hexenyl alcohol. Certain esters also have solubility properties meeting the above conditions. These include ethyl acetate, propyl acetate, butyl carbitol acetate, cellosolve acetate, ethyl acetoacetate, glycerol triacetate and glycol acetate. Acids which may be used as selective solvents are exemplified by isobutyric acid. Aldehydes which are useful for the present purpose include crotonaldehyde. Alkyl sulfonic acids and diethyl formal may be used. Certain ketones may be employed for this purpose, such as diethyl ketone. Special solvents such as diethyl sulfone may be employed.

These selective solvents may be added to the other components of the reaction mixture either prior to or subsequent to formation of the crystalline complexes. Preferably they are present before the reaction is initiated. In the latter case, it is preferred that they be present in an amount at least equal by volume to that of the mixture of organic compounds being fractionated. If the selective solvent is added to the reaction mixture subsequent to the formation of crystalline complexes, it should be employed in an amount at least sufficient to promote phase separation and to cause the complexes to become associated with the solution of the complex-forming agent.

The complex-forming agent, as explained above, is to be selected from the group of urea analogs having the general formula

wherein X is an element selected from the right-hand side of group VI of the periodic table and especially those elements having a molecular weight less than about 128. Hence, X may be an element of the group O, S, Se or Te and the complex-forming agents derived therefrom are urea, thiourea, selenourea and tellurourea, respectively. The salts of these agents may be used in a similar manner and are to be understood as included in the above general formula. Typical salts are the hydrochlorides and the acetates of urea and thiourea.

The preferred solvent for the agent to be used in the present process is water or at least a solvent having a substantial proportion of water such as aqueous alcohol. The selective solvents for the organic compounds to be used in the present process are found to operate in an especially desirable manner when the complex-forming agent is dissolved in water. However, other solvents may be used together with or in place of water. In this case, the present invention still applies, but a solvent must be chosen which satisfies the solubility characteristics specified in the statement of the invention. If maximum removal of a particular fraction from a mixture is desired, the agent should be present as a saturated solution at all times. As crystalline complexes are formed during the treatment, the solution of the agent becomes depleted and this latter desirable condition is no longer present unless the proper precautions have been taken. Saturation of the solution of the agent may be maintained by continuously adding further quantities of the agent or by continual reduction in the temperature of complex formation. In order to allow flexibility of the process, it is desirable to contact the mixture of organic compounds with a large excess of the complex-forming agent so that the solution is never seriously depleted.

The agents have been found to form crystalline complexes with specific types of organic compounds, each agent having special characteristics in this regard. Urea forms crystalline complexes with substantially unbranched hydrocarbons having from about 3 to over 50 carbon atoms in a straight chain.

Substantially normal hydrocarbons forming crystalline complexes with urea include especially those having 4 to 26 carbon atoms, such as octane and hexadecane. Olefins such as 6-dodecene and other normal unsaturated hydrocarbons including 3,5-decadiene and propyldiacetylene may be used as well.

Urea has been found to form crystalline complexes with substantially unbranched organic compounds containing oxygen such as alcohols, aldehydes, ketones and acids, especially the long chain fatty acids. Furthermore, urea will form crystalline complexes with heterocyclic oxygen compounds such as furan, halogenated compounds and acyclic nitrogen compounds, particularly the amines and the chlorinated hydrocarbons.

Thiourea has been found to form complexes with highly branched materials and naphthenes, especially the isoparaffins.

Typical isoparaffins and iso-olefins forming thiourea complexes are 2,4-dimethyloctane, 3,6-dimethyldodecane and their analogs and homologs. Naphthenes forming thiourea complexes are exemplified by cyclohexane and methylcyclohexane.

Selenourea has been found to react with a wider variety of materials than either urea or thiourea and is used in special cases where rougher fractionation is satisfactory. These substances may be in admixture with each other and further diluted by the presence of other materials not specified above. The hydrocarbons have been found to form complexes with these particular agents with especial ease and hence are a preferred group of substances to be treated by the process of the present invention.

The reactants may be contacted under a wide range of conditions in regard to temperature. It has been found that a critical temperature range exists for each specific complex below or above which that complex cannot be formed. This critical temperature range varies, moreover, with the concentration of the agent in its solution. These two factors may be adjusted for the fractionation of mixtures containing more than one material capable of forming complexes with the agent employed. These critical limits can only be determined experimentally.

The solution of the agent and the mixture of organic compounds to be fractionated may be contacted in any desirable manner so as to promote intimate association in order to encourage rapid crystalline complex formation.

When the selective solvents are used in accordance with the present invention, the reaction mixture subsequent to complex formation rapidly separates into three phases. These are the phases containing the remaining organic compounds which have not formed crystalline complexes with the agent; the crystalline complexes formed during the reaction; and the solution of the remaining complex-forming agent. In addition, the complexes are found to be associated with the solution of the agent. By the term "associated with" is meant that the crystalline complexes are dispersed through, suspended in or settled at the bottom of the solution of the agent and are thus cleanly separated from the remaining members of the original mixture of organic compounds.

Due to this type of phase separation, it is a simple matter to isolate the complexes in a relatively high state of purity and also to separate them cleanly from the other members of the original mixture. Having been separated by such a means as filtration or centrifuge, the complexes may be used without further modification or may be subjected to mild decomposition processes whereby the agent is recovered in its original form and the organic compound also recovered. The following example represents a typical embodiment of the present invention.

*Example*

Ten parts by volume of a gasoline fraction containing about 20% substantially unbranched hydrocarbons were dissolved in an equal volume of secondary butyl alcohol and shaken with 50 parts by volume of a saturated aqueous urea solution at 20° C. A crystalline complex forms which settles into the aqueous urea solution, the latter solution being sharply separated from the remaining gasoline phase when the mixture is allowed to stand for a short time. The unreacted gasoline components were decanted from the urea solution after which the latter was heated together with the urea complexes present. The complexes decomposed at a temperature of about 40° C., the urea thus regenerated dissolving in the aqueous phase and the hydrocarbons regenerated rising to the top of the aqueous layer. The hydrocarbons were found to have a straight-chain content of approximately 85%.

I claim as my invention:

1. The extractive crystallization process which comprises dissolving petroleum hydrocarbons containing at least a fraction having substantially unbranched structure in iso-butanol and contacting the solution so formed with an aqueous solution of urea, whereby crystalline complexes are formed between urea and at least a part of said fraction, said complexes being associated with the urea solution.

2. The extractive crystallization process which comprises contacting petroleum hydrocarbons dissolved in pentanol-2 with an aqueous urea solution, a fraction of said hydrocarbon having substantially unbranched structure, whereby crystalline complexes are formed between at least part of said fraction and urea, said complexes being associated with the aqueous urea solution.

3. The extractive crystallization process which comprises contacting petroleum hydrocarbons dissolved in secondary butyl alcohol with an aqueous solution of urea, a fraction of said hydrocarbons having substantially unbranched structure, whereby crystalline complexes are formed between urea and at least part of said fraction, said complexes being associated with the aqueous urea solution.

4. In a process for the separation of straight chain hydrocarbons from their mixture with non-straight chain hydrocarbons, which comprises contacting the mixture with an aqueous solution of urea so as to form crystalline molecular complexes of urea with straight chain hydrocarbons and separating the complexes from non-straight chain hydrocarbons, the improvement which comprises conducting said separation in the presence of an aliphatic polar solvent for said hydrocarbons, said solvent being completely miscible with the hydrocarbon mixture and also being soluble in the aqueous urea solution in the proportions between 5 and 20 parts of the solvent per 100 parts of said urea solution.

5. In a process for the fractionation of a mixture containing straight chain and branched chain hydrocarbons wherein said mixture is contacted with an aqueous solution of an agent of the group consisting of urea and thiourea so as to form crystalline complexes of the group consisting of urea-straight chain hydrocarbon complexes and thiourea-branched chain hydrocarbon complexes and said complexes are separated from remaining hydrocarbons, the improvement which comprises effecting said separation in the presence of an aliphatic polar solvent, said solvent being completely miscible with the hydrocarbon mixture and from 5 to 20 parts of said solvent being soluble in 100 parts of the aqueous solution of the complex-forming agent.

6. In a process for the fractionation of a mixture containing straight chain organic compounds and branched chain organic compounds wherein said mixture is contacted with an aqueous solution of an agent of the group consisting of urea and thiourea to form crystalline molecular complexes of the group consisting of urea-straight chain compounds and thiourea-branched chain compounds and said complexes are separated from remaining organic compounds, the improvement which comprises dissolving said mixture in an aliphatic polar solvent, said solvent being completely miscible with the mixture of organic compounds, 5 to 20 parts of said solvent being soluble in 100 parts by weight of the aqueous solution of the complex-forming agent.

7. In a process for the fractionation of a mixture containing straight-chain and branched-chain hydrocarbons wherein said mixture is contacted with an aqueous solution of an agent of the group consisting of urea and thiourea so as to form crystalline complexes of the group consisting of urea-straight-chain hydrocarbon complexes and thiourea-branched-chain hydrocarbon complexes and said complexes are separated from remaining hydrocarbons, the improvement which comprises effecting said separation in the presence of an aliphatic monohydric alcohol having from 4 to 6 carbon atoms.

8. In a process for the fractionation of a mixture containing straight-chain and branched-chain hydrocarbons wherein said mixture is contacted with an aqueous solution of an agent of the group consisting of urea and thiourea so as to form crystalline complexes of the group consisting of urea-straight-chain hydrocarbon complexes and thiourea-branched-chain hydrocarbon complexes and said complexes are separated from remaining hydrocarbons, the improvement which comprises effecting said separation in the presence of a branched-chain aliphatic monohydric alcohol having from 4 to 6 carbon atoms.

9. In a process for the fractionation of a mixture containing straight-chain organic compounds and branched-chain organic compounds wherein said mixture is contacted with an aqueous solution of an agent of the group consisting of urea and thiourea to form crystalline molecular complexes of the group consisting of urea-straight-chain compounds and thiourea-branched-chain compounds and said complexes are separated from remaining organic compounds, the improvement which comprises dissolving said mixture in an aliphatic monohydric alcohol having from 4 to 6 carbon atoms.

10. In a process for the fractionation of a mixture containing straight-chain organic compounds and branched-chain organic compounds wherein said mixture is contacted with an aqueous solution of an agent of the group consisting of urea and thiourea to form crystalline molecular complexes of the group consisting of urea-straight-chain compounds and thiourea-branched-chain compounds and said complexes are separated from remaining organic compounds, the improvement which comprises dissolving said mixture in an aliphatic monohydric alcohol having from 4 to 6 carbon atoms, the amount of said alcohol being at least equal by volume to that of the mixture of organic compounds dissolved therein.

11. In a process for the fractionation of a mixture containing straight-chain and branched-chain hydrocarbons wherein said mixture is contacted with an aqueous solution of an agent of the group consisting of urea and thiourea so as to form crystalline complexes of the group consisting of urea-straight-chain hydrocarbon complexes and thiourea-branched-chain hydrocarbon complexes and said complexes are separated from remaining hydrocarbons, the improvement which comprises effecting said separation in the presence of a solvent of the group consisting of aliphatic monohydric alcohols, aliphatic ketones and aliphatic esters, said solvent being completely miscible with the hydrocarbon mixture and from 5 to 20 parts of said solvent being soluble in 100 parts of the aqueous solution of the complex-forming agent.

12. In a process for the fractionation of a mixture containing straight-chain and branched-chain organic compounds wherein said mixture is contacted with an aqueous solution of an agent of the group consisting of urea and thiourea so as to form crystalline complexes of the group consisting of urea-straight-chain organic compound complexes and thiourea-branched-chain organic compound complexes and said complexes are separated from remaining organic compounds, the improvement which comprises effecting said separation in the presence of a solvent of the group consisting of aliphatic monohydric alcohols, aliphatic ketones and aliphatic esters, said solvent being completely miscible with the organic compound mixture and from 5 to 20 parts of said solvent being soluble in 100 parts of the aqueous solution of the complex-forming agent.

13. In a process for the fractionation of a mixture containing straight-chain and branched-chain hydrocarbons wherein said mixture is contacted with an aqueous solution of an agent of the group consisting of urea and thiourea so as to form crystalline complexes of the group consisting of urea-straight-chain hydrocarbon complexes and thiourea-branched-chain hydrocarbon complexes and said complexes are separated from remaining hydrocarbons, the improvement which comprises effecting said separation in the presence of an aliphatic polar solvent having from 4 to 6 carbon atoms, said solvent being completely miscible with the hydrocarbon mixture and from 5 to 20 parts of said solvent being soluble in 100 parts of the aqueous solution of the complex-forming agent.

14. In a process for the fractionation of a mixture containing straight-chain and branched-chain hydrocarbons wherein said mixture is contacted with an aqueous solution of an agent of the group consisting of urea and thiourea so as to form crystalline complexes of the group consisting of urea-straight-chain hydrocarbon complexes and thiourea-branched-chain hydrocarbon complexes and said complexes are separated from remaining hydrocarbons, the improvement which comprises effecting said separation in the presence of a solvent having from 4 to 6 carbon atoms of the group consisting of aliphatic monohydric alcohols, aliphatic ketones and aliphatic esters, said solvent being completely miscible with the hydrocarbon mixture and from 5 to 20 parts of said solvent being soluble in 100 parts of the aqueous solution of the complex-forming agent.

LLOYD C. FETTERLY.

REFERENCES CITED

The following references are of record in the file of this patent:

UNITED STATES PATENTS

| Number | Name | Date |
|---|---|---|
| 2,300,134 | Priewe | Oct. 27, 1942 |

OTHER REFERENCES

Technical Oil Mission, Reel 143, translation by Shell Development Co., of German application B190,197 (Bengen), deposited in Library of Congress May 22, 1946 (included in Index released May 31, 1946) (5 pages, 2-6 inclusive, only).